US012674583B2

(12) United States Patent
Panjer

(10) Patent No.: US 12,674,583 B2
(45) Date of Patent: Jul. 7, 2026

(54) OVEN

(71) Applicant: B/E Aerospace, Inc., Winston-Salem, NC (US)

(72) Inventor: Frederik Adrian Stephan Panjer, Maarsbergen (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 363 days.

(21) Appl. No.: 18/466,946

(22) Filed: Sep. 14, 2023

(65) Prior Publication Data

US 2024/0102664 A1 Mar. 28, 2024

(30) Foreign Application Priority Data

Sep. 23, 2022 (EP) .................................... 22197535

(51) Int. Cl.
| | |
|---|---|
| *F24C 14/00* | (2006.01) |
| *A47J 27/04* | (2006.01) |
| *B08B 3/02* | (2006.01) |
| *F24C 15/00* | (2006.01) |

(52) U.S. Cl.
CPC ............. *F24C 14/005* (2013.01); *A47J 27/04* (2013.01); *B08B 3/02* (2013.01); *F24C 15/003* (2013.01); *A47J 2027/043* (2013.01)

(58) Field of Classification Search
CPC ......... F24C 14/005; F24C 15/003; B08B 3/02

USPC .................................. 126/20, 19 R; 219/401
See application file for complete search history.

(56) References Cited

U.S. PATENT DOCUMENTS

| | | | |
|---|---|---|---|
| 5,044,555 A | 9/1991 | Youngeberg et al. |
| 8,857,324 B2 | 10/2014 | Hozumi et al. |
| 2010/0224616 A1 | 9/2010 | Yasuhara |

FOREIGN PATENT DOCUMENTS

| | | | | |
|---|---|---|---|---|
| DE | 202012104257 U1 | 12/2012 | | |
| KR | 20100010309 A | * 2/2010 | .......... | F24C 15/2057 |

OTHER PUBLICATIONS

Abstract of DE202012104257 (U1) , Published: Dec. 6, 2012, 1 page.
Abstract of KR20100010309 (A); Published: Feb. 1, 2010, 1 page.
European Search Report for Application No. 22197535.2, mailed Feb. 20, 2023, 8 pages.

* cited by examiner

*Primary Examiner* — Vivek K Shirsat
(74) *Attorney, Agent, or Firm* — CANTOR COLBURN LLP

(57) ABSTRACT

An oven comprising an injection nozzle includes a nozzle member that has a fluid inlet and a first fluid outlet that is in communication with the inlet The nozzle member is movable between: (i) a first position, in which the first fluid outlet is arranged so as to direct fluid towards and onto a component of the oven to be cleaned; and (ii) a second position, in which the first fluid outlet is blocked or otherwise arranged so as not to direct fluid towards and onto said component.

18 Claims, 4 Drawing Sheets

OVEN

CROSS REFERENCE TO RELATED APPLICATION

This application claims priority to European Patent Application No. 22197535.2 filed Sep. 23, 2022, the entire contents of which is incorporated herein by reference.

FIELD

The present disclosure related generally to ovens, steam ovens, heating assemblies for steam ovens and methods of using steam ovens.

BACKGROUND

Known steam ovens for cooking food include a heating assembly having an injection nozzle, a heater, and a ventilator. In use, the injection nozzle injects water, which is vaporized by the heater, and distributed throughout the oven by the ventilator.

SUMMARY

According to a first aspect, the present disclosure provides an oven comprising an injection nozzle comprising a nozzle member that has a fluid inlet and a first fluid outlet that is in communication with the inlet, wherein the nozzle member is movable between: (i) a first position, in which the first fluid outlet is arranged so as to direct fluid towards and onto a component of the oven to be cleaned; and (ii) a second position, in which the first fluid outlet is blocked or otherwise arranged so as not to direct fluid towards and onto said component.

The fluid may be any suitable fluid such as water.

The oven may be a steam oven, the oven further comprising a second fluid outlet in communication with the inlet, wherein the second fluid outlet is open in the second position, and arranged so as to direct fluid towards a heater of the steam oven.

Accordingly, the steam oven comprises said heater and, in a cooking mode, the heater will vaporise the fluid to form steam, which will circulate in the oven to heat or cook food located therein. A ventilator (i.e. a fan) may be used to aid in the circulation of the steam.

The second fluid outlet may also be open in the first position.

The inlet may be in fluid communication with the first outlet and the second outlet via a conduit in the nozzle member. The conduit may extend along a longitudinal axis of the nozzle member The oven may further comprise a heating chamber for heating food in a cooking mode, and an inner chamber, wherein the heating chamber and the inner chamber are separated by a baffle plate, and wherein at least part of the nozzle member is located in the inner chamber.

The inner chamber may be partially defined by the baffle plate and a rear wall opposing the baffle plate, wherein the nozzle member extends through the rear wall.

The inner chamber may be additionally partially defined by at least one side wall and the nozzle member may extend through one of said at least one side walls, rather than through the rear wall.

The heater and ventilator may be located in the inner chamber.

The component of the oven to be cleaned may be the rear wall.

The component of the oven to be cleaned may be the baffle plate.

The component may be any component of the oven that may require cleaning, e.g. due to the build-up of contamination. For the avoidance of doubt, the component to be cleaned is not the heater.

The nozzle member may be configured to move between said first and second positions along an axis, and wherein the nozzle member is configured such that when it the first position it ejects fluid from the first fluid outlet at a non-orthogonal angle to said axis, optionally wherein the angle is between 80 degrees and 140 degrees.

The injection nozzle may comprise a support, wherein the nozzle member is moveable relative to the support, and the support comprising an actuator for moving the nozzle member between the first and second positions.

The support may be a housing that at least partially surrounds the movable nozzle member.

The support may comprise a resilient biasing member acting on the nozzle member, wherein the resilient biasing member biases the nozzle member towards either the first position or the second position.

The resilient biasing member may be a spring.

The actuator may comprise a solenoid that acts on the nozzle member when it is activated so as to cause it to move between the first and second positions.

The solenoid may move the nozzle member in an opposing direction to the direction in which the resilient biasing member biases the nozzle member.

The oven may be configured such that when the nozzle member moves from the first position to the second position, the first outlet moves into contact with a sealing member so as to block the first outlet.

The support may comprise the sealing member.

The sealing member may be a tubular sealing member that the nozzle member moves through when moving between the first and second positions.

The nozzle member may extend beyond the support in the direction of the axis along which the nozzle member is configured to move such that, in the first position, the first outlet is located longitudinally beyond an end of the support and, in the second position, the first outlet is located in contact with the sealing member of the support.

The oven may further comprise a first container for containing water, wherein the first container is in fluid communication with the inlet; and second container for containing a cleaning fluid other than water, wherein the second container is selectively in fluid communication with the inlet.

The cleaning fluid from the second container may be selectively supplied to the inlet such that it is only supplied during a cleaning mode, i.e. when the nozzle member is arranged in the first position so as to clean the component of the oven. The supply of cleaning fluid to the inlet may be terminated prior to the end of the cleaning mode and whilst water from the first container is still being supplied to the inlet. This enables the water to wash out the cleaning fluid from the injection nozzle prior to the end of the cleaning mode (i.e. prior to moving the nozzle member to the second position so as to perform the cooking mode in which water is directed onto the heater).

The baffle plate may have an opening therein. A ventilator may be located proximate the opening, such that the ventilator can distribute the steam formed by the heater into and around the heating chamber of the steam oven via the opening.

The heater and the ventilator may extend from the rear plate.

The heater may encircle the ventilator

In a cooking mode, the heater will cause water from the injection nozzle to evaporate, and the ventilator will distribute the resulting steam through the opening in the baffle plate.

According to a second aspect, the present disclosure provides a steam oven comprising a rear wall, a baffle plate defining a wall of a heating compartment, a heater arranged between the rear wall and the baffle plate, and an injection nozzle comprising a nozzle member extending into a space between the rear wall and the baffle plate, wherein the nozzle member has a fluid receiving inlet, a first fluid outlet for supplying water to the heater so as to generate steam, and a second fluid outlet for supplying a fluid to the rear plate and/or baffle plate so as to clean it, and wherein the nozzle is movable between: (i) a first position, in which the second fluid outlet is arranged so as to direct a fluid towards and onto the rear plate and/or baffle plate; and (ii) a second position, in which the second fluid outlet is blocked or otherwise arranged so as not to direct fluid towards and onto said component.

The present disclosure is not limited to the oven or steam oven in its entirety, but also extends to the heating assembly for a steam oven. According to a third aspect, the present disclosure provides a heating assembly for a steam oven, comprising a heater, and a nozzle member that has a fluid inlet and a first fluid outlet that is in communication with the inlet, wherein the nozzle member is movable within the heating assembly between: (i) a first position, in which the first fluid outlet is not blocked and may eject fluid; and (ii) a second position, in which the first fluid outlet is blocked.

The heating assembly may also comprise a ventilator for distributing steam in a steam oven.

The heating assembly may have any of the other features described herein in relation into the steam oven.

According to a fourth aspect, the present disclosure provides a method of using a steam oven as previously described, the method comprising moving the nozzle member into the first position and supplying fluid to the inlet so as to eject the fluid from the nozzle member onto the component of the oven so as to clean it, and moving the nozzle member to the second position so as to block the first fluid outlet, wherein the nozzle member has a second fluid outlet in communication with the inlet and the steam oven has a heater; and wherein, when the nozzle member is arranged in the second position, the method comprises supplying water to the inlet so as to eject water from the nozzle member onto the heater to thereby generate steam.

The steam may be supplied to a heating chamber of the steam oven for heating food arranged therein. The method may comprise supplying a cleaning fluid other than water to the inlet when the nozzle member is in the first position. The cleaning fluid may comprise a detergent.

BRIEF DESCRIPTION OF DRAWINGS

Various embodiments will now be described, by way of example only, and with reference to the accompanying drawings in which.

DETAILED DESCRIPTION

Figure 1:
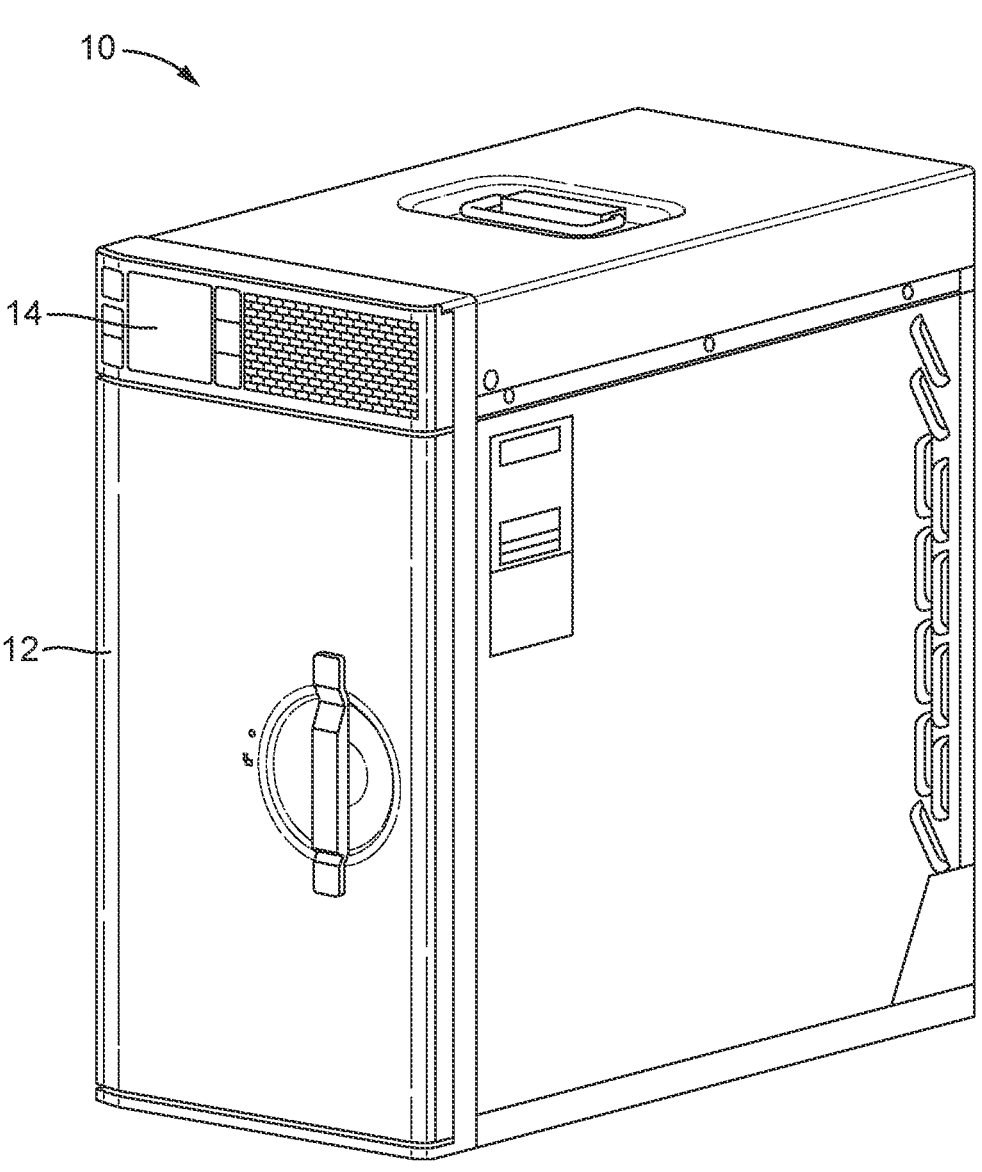
FIG. 1 shows a steam oven for use in the galley of an airplane.

FIG. 1 shows a steam oven 10 designed to be located in the galley of an airplane for cooking food. The steam oven comprises a door 12 and a control panel 14 for controlling the oven 10, such as to turn it on and off, and vary settings such as temperatures and cooking times.

Figure 2:
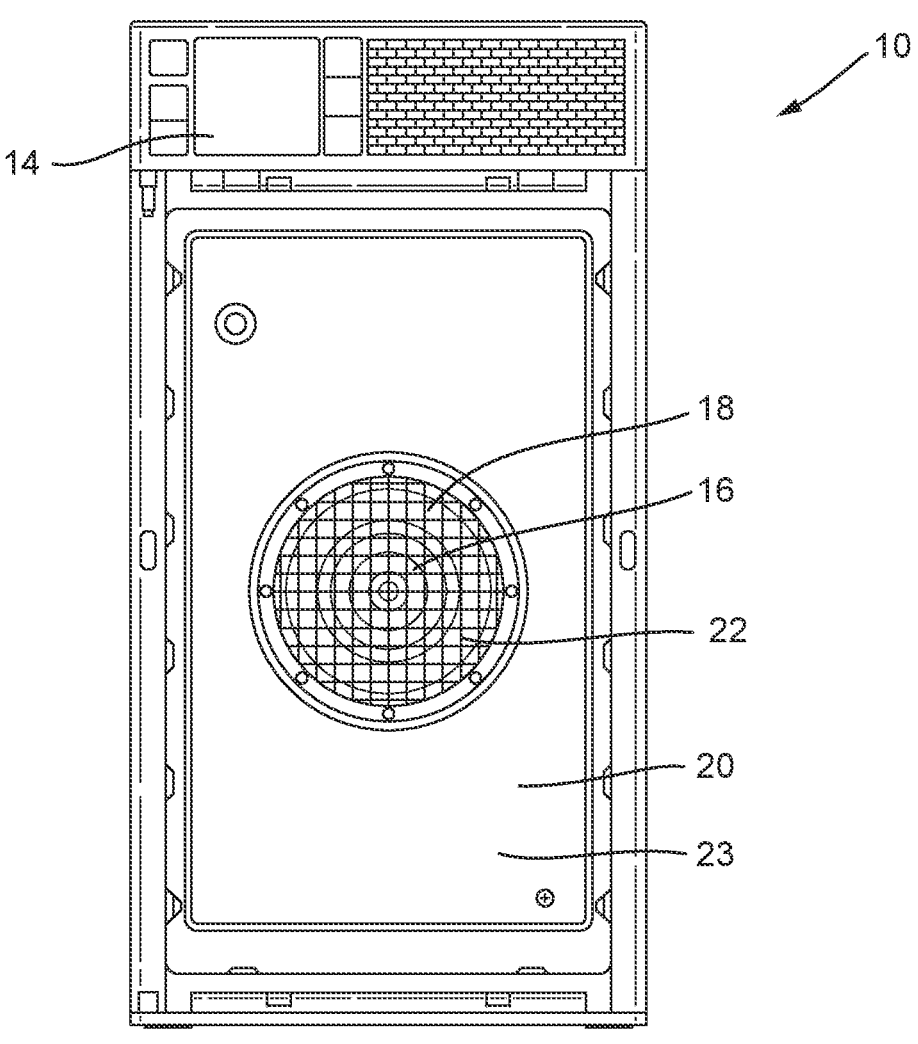
FIG. 2 shows a front view of the steam oven of FIG. 1, with the door removed.

FIG. 2 shows a front view of the steam oven 10 of FIG. 1, with the door 12 removed. The steam oven 10 comprises a heating chamber 23 and an inner chamber in which steam is generated. The inner chamber is separated from the heating chamber by a baffle plate 20 having an aperture 18 therein. A ventilator 16 (also known as a fan) is located in the inner chamber proximate to the aperture 18 of the baffle plate 20, for blowing steam generated in the inner chamber into the heating chamber, and circulating it therein. The aperture may be covered with a mesh or grid 22 for safety reasons, whilst allowing the flow of air and steam therethrough. In use, food to be cooked will be inserted into the heating chamber 23 of the steam oven 10.

Figure 3:
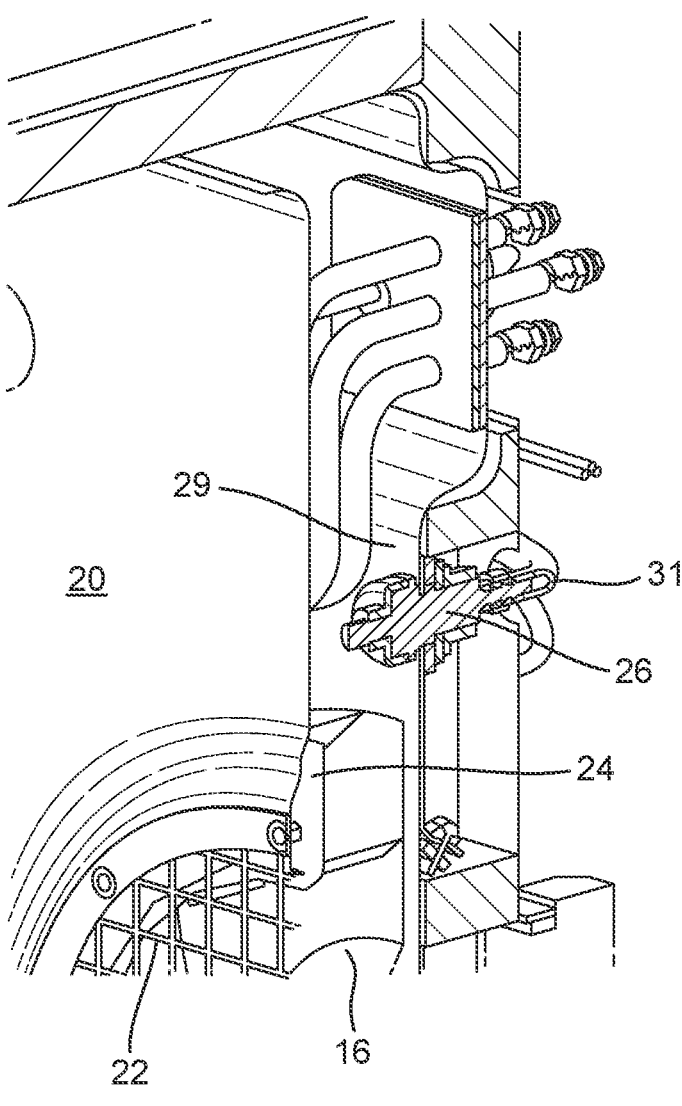
FIG. 3 shows a cross-sectional view of a portion of the steam oven of FIGS. 1 and 2.

FIG. 3 shows a cross sectional view of a portion of the steam oven of FIGS. 1 and 2, showing a heating assembly in the inner chamber. The inner chamber is partially defined by the baffle plate 20 and a rear wall 29 of the steam oven 10. The heating assembly includes the ventilator 16, a heater 24 extending around the ventilator 16, and an injection nozzle 26 extending from the rear wall 29 of the oven 10. In use, the nozzle injects water into the oven. The water is vaporized by the heater 24, and the resulting steam is distributed into the heating chamber 22 of the oven, via the aperture 18 in the baffle plate, by the ventilator 16.

As shown in FIG. 3, the injection nozzle may be connected to a water line 31 for supply of water (and optionally other fluids) thereto. The nozzle 26 comprises one or more outlet, which is directed such that the water that is supplied by the water line 31 is ejected towards the heater 24. The nozzle may be located above the heater for this purpose, e.g. such that the water from the nozzle drops onto the heater due to gravity, or the nozzle may be located at other positions and the water sprayed onto the heater. The size of the outlet and the pressure of the water may be such that the water is ejected from the nozzle in the form of a spray.

Figure 4:
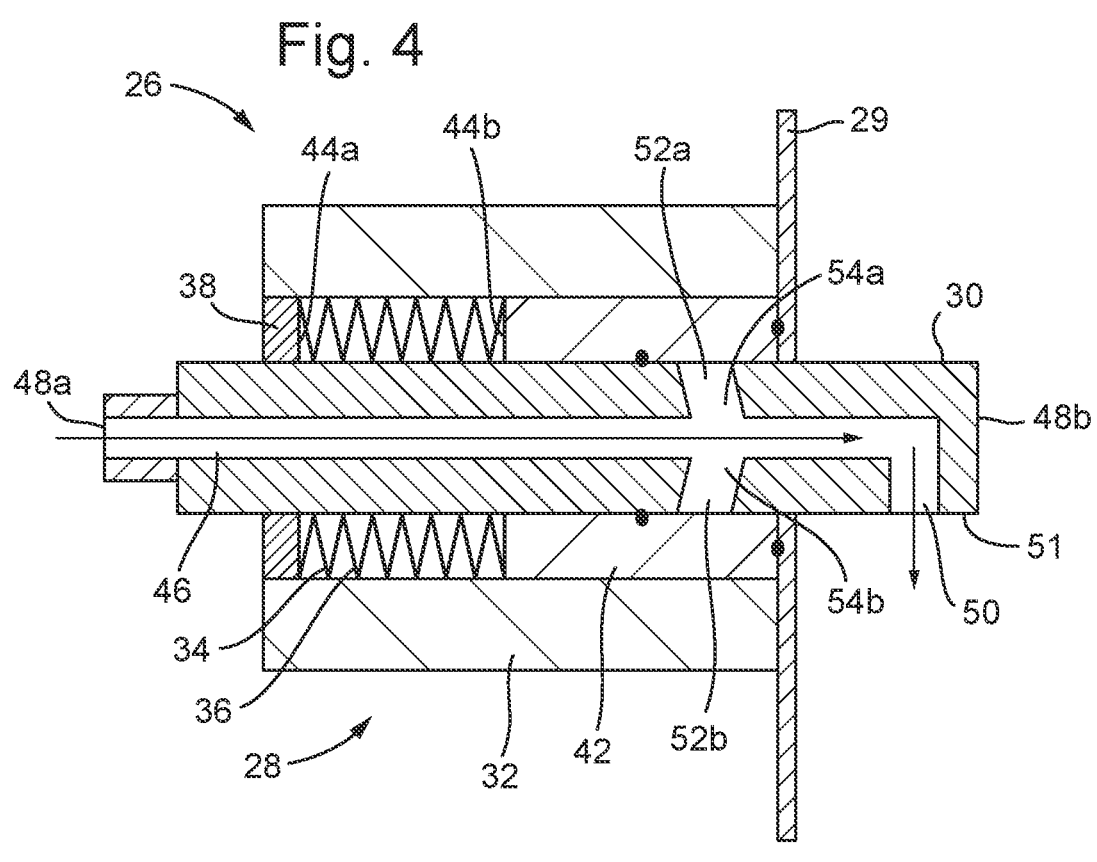
FIG. 4 shows an injection nozzle in accordance with an embodiment of the present disclosure, whilst in a first, steam-generating position.

FIG. 4 shows an injection nozzle 26 according to an embodiment of the present disclosure. The nozzle 26 comprises a housing 28 and a moveable nozzle member 30. The housing 28 comprises a solenoid 32 surrounding a chamber 34. The nozzle member 30 is located in the chamber 34. The nozzle member is elongate in a longitudinal direction, and extends along a longitudinal axis. The nozzle member 30 comprises a radially extending shoulder 38, the shoulder having an outer diameter that is substantially the same as the inner diameter of the chamber 34. A compression spring 36 and a bushing 42 are located in the chamber 34. The bushing 42 extends along a portion of the longitudinal length of the chamber 34, and encircles a portion of the nozzle member 30. The compression spring 36 also encircles a portion of the nozzle member and abuts the shoulder 38 at one end 44a and the bushing 42 at the other end 44b of the compression spring 36.

Figure 5:
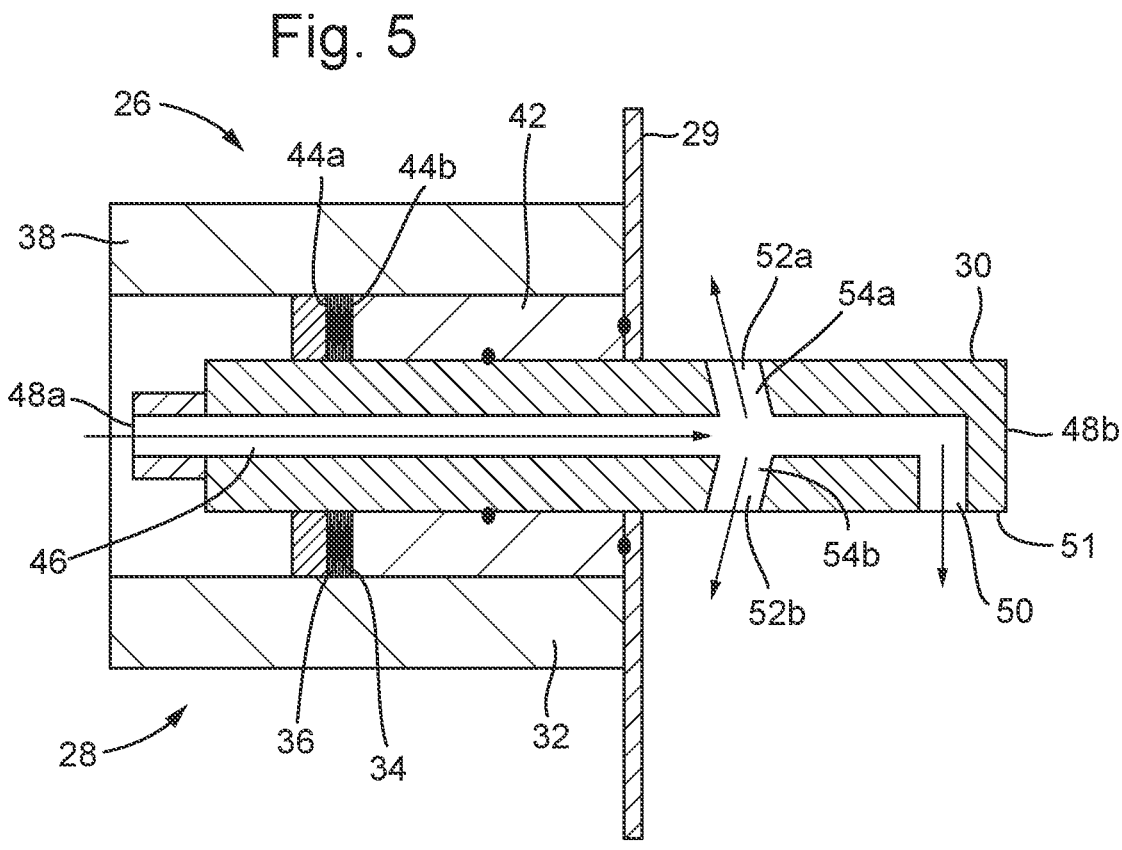
FIG. 5 shows the injection nozzle of FIG. 4, whilst in a second, cleaning position.

The nozzle member 30 is moveable relative to the housing 28, with the compression spring 36 biasing the nozzle member 30 to a first position, as shown in FIG. 4. The nozzle member 30 can be actuated to move by means of the solenoid 32. When the solenoid is activated, by means of passing a current therethrough, it forms a magnetic field which will act on a portion of the nozzle member so as to cause it to move. The solenoid, nozzle member and spring are configured such that when the solenoid is activated the nozzle member 30 will be caused to move in an opposing direction to that of the bias of the compression spring 36, i.e. to compress the compression spring 36. In the illustrated Figures, the compression spring biases the nozzle member 30 to a first position (as shown in FIG. 4). As such, when the solenoid 32 is activated, the nozzle member 30 will be caused to move to a second position (as shown in FIG. 5), and when the solenoid 32 is not activated, the compression spring 36 will cause the nozzle member 30 to return to the first position. Alternatively, both the bias direction of the compression spring 36 and the direction in which the solenoid acts may be reversed. Alternatively, any other suitable means may be used to move the nozzle member, including mechanical means such as a linear screw drive actuator or a cam shaft and a compression spring.

The bushing 42 may be fluidly sealed to the nozzle member 30 and the rear wall 29 of the oven. Any suitable seal may be used, such as an O-ring. The seal between the bushing 42 and the nozzle member 30 must allow for the nozzle member to move relative to the bushing 42.

The nozzle member 30 comprises a conduit 46 extending from a fluid inlet at a first end 48a of nozzle member, to first and second fluid outlets. The conduit extends to a second fluid outlet 50 located proximate to a second end 48b of the nozzle member. The second fluid outlet 50 may be located in a radial wall 51 of the nozzle member 30. The nozzle member also comprises at least one first fluid outlet 52a,b. As shown in FIG. 4, the nozzle member 30 may comprise two first outlets 52a,b. Each first outlet 52a,b is connected to the conduit 46 via a first outlet conduit 54a,b. The first outlet conduit(s) 54a,b may be connected to the conduit 46 between the first end 48a of the nozzle member 30 and the second outlet 50 proximate to the second end 48b. Each first outlet 52a,b may be located in a radial wall 51 of the nozzle member 30. Each first outlet conduit may be angled relative to the longitudinal axis of the nozzle member 40 such that, in use, the spray from the first outlet(s) is directed towards a component of the oven to be cleaned, as will be discussed below. The angle may be a non-orthogonal angle.

In use, the conduit 46 at the first end 48a of the nozzle member is connected to a water line. When the nozzle member 30 is in the first position, as shown in FIG. 4, the first outlet(s) 52a are closed by means of being located within the bushing 42 such that they are blocked. This is the "cooking" position. When water is supplied to the conduit 46 via the water line, the water exits the conduit 46 solely via the second outlet 50, which directs the water to the heater 24 so as to generate steam that is then blown into the heating chamber 23 by ventilator 16, as in standard steam ovens.

FIG. 5 shows the nozzle member 30 in the second position. This is the "cleaning position". As discussed above, the nozzle member is moved to this position when the solenoid is activated. As can be seen, activation of the solenoid has caused the movable member to move such that the first outlet(s) 52a,52b pass out of the bushing 42 and are no longer blocked. The movable member has been moved from the first position to the second position, such that the first outlet(s) 52a,52b pass through the rear wall 29 and into the inner chamber located between the rear wall and the baffle plate 20. When water is supplied to the conduit 46 via the water line, the water exits the conduit 46 via the first and the second outlets 50, 52a,b. The water exiting the first outlets 52a,b is directed towards the rear plate 29 of the oven, and aids in cleaning this plate.

Alternatively, the first conduits could be angled so as to direct the water (which may be in the form of a spray) to any component in the inner chamber located between the rear plate 29 and the baffle plate 20, such as the rear side of the baffle plate facing the rear plate 29.

In steam ovens, contamination may build up in both the inner chamber and the heating chamber. This can cause the oven to be less efficient, due to contamination on the heating assembly, and cause a hygiene risk. The heating chamber can be cleaned manually, as it is accessible via the door. However, it is more difficult to clean the components in the inner chamber. In prior steam ovens, in order to clean rear plate 29, or the rear side of the baffle plate facing the rear plate, it would be necessary to remove the baffle plate 20. This would usually require removing steam oven 10 from the galley of an airplane for a period of time. The nozzle of the present invention allows cleaning of this area without removal of the baffle plate. The cleaning cycle may be run, with the nozzle in the second, "cleaning" position, at regularly intervals, such as after every cooking cycle, or at the end of a flight, or as desired. This may be automatic or controlled using the control panel 14. The heater and/or ventilator may be turned on or off as desired. If a cleaning cycle is run after a cooking cycle, it may not be necessary to use the heater, due to residual heat in the oven.

As described above, the water line generally carries water for use is generating steam during the cooking mode (when the injection nozzle is in the second position). This water is then vapourised by the heater and the steam distributed by the ventilator, as discussed above.

However, when the steam oven is in the cleaning mode (wherein the injection nozzle is in the first position), a cleaning agent may be added to the water that is introduced into the water line or a cleaning agent may be introduced into the water line instead of water. The cleaning agent may be located in a cleaning agent reservoir. In the cleaning mode, the cleaning agent may be added to the water throughout the entirety of the cleaning mode or, optionally, there may be time period at the end of the cleaning mode wherein the cleaning agent is not added to the water, in order to remove any cleaning agent from the water line prior to the next cooking cycle (wherein the injection nozzle is in the second position).

The steam oven may be programmed to run a cleaning cycle after every cooking cycle. Alternatively or additionally, a cleaning cycle may be manually selected at any time. For example, the user may select to run a cleaning cycle after every flight.

Whilst the injection nozzle has been described with respect to a steam oven, it will be understood that the injection nozzle could be used with any oven, such as a convection oven.

The invention claimed is:

1. A steam oven comprising:

a heater; and an injection nozzle comprising a nozzle member that has a fluid inlet and a first fluid outlet that is in communication with the inlet;

wherein the nozzle member is movable between: (i) a first position, in which the first fluid outlet is arranged to direct fluid towards and onto a component of the oven to be cleaned; and (ii) a second position, in which the first fluid outlet is blocked or otherwise arranged so as not to direct fluid towards and onto said component;

wherein the oven is a steam oven, the steam oven further comprising:

a second fluid outlet in communication with the inlet, wherein the second fluid outlet is open in the second position, and arranged so as to direct fluid towards the heater.

2. The steam oven of claim 1, further comprising:

a heating chamber for heating food in a cooking mode;

an inner chamber; and a baffle plate that separates the heating chamber and the inner chamber;

wherein at least part of the nozzle member is located in the inner chamber.

3. The steam oven of claim 2, wherein the inner chamber is partially defined by the baffle plate and a rear wall opposing the baffle plate, wherein the nozzle member extends through the rear wall.

4. The steam oven of claim 3, wherein the component of the oven to be cleaned is the rear wall.

5. The steam oven of claim 2, wherein the component of the steam oven to be cleaned is the baffle plate.

6. The steam oven of claim 1 wherein the nozzle member is configured to move between said first and second positions along an axis, and wherein the nozzle member is configured such that when it the first position it ejects fluid from the first fluid outlet at a non-orthogonal angle to said axis.

7. The steam oven of claim 6, wherein the non-orthogonal angle is between 80 degrees and 140 degrees.

8. The steam oven of claim 1, wherein the injection nozzle comprises a support, wherein the nozzle member is moveable relative to the support, and the support comprising an actuator for moving the nozzle member between the first and second positions.

9. The steam oven of claim 8, wherein the support comprises a resilient biasing member acting on the nozzle member, wherein the resilient biasing member biases the nozzle member towards either the first position or the second position.

10. The oven of claim 8, wherein the actuator comprises a solenoid that acts on the nozzle member when it is activated so as to cause it to move between the first and second positions.

11. The steam oven of claim 1, configured such that when the nozzle member moves from the first position to the second position, the first outlet moves into contact with a sealing member so as to block the first outlet.

12. The steam oven of claim 1, further comprising:

a first container for containing water, wherein the first container is in fluid communication with the inlet; and a second container for containing a cleaning fluid other than water, wherein the second container is selectively in fluid communication with the inlet.

13. The steam oven of claim 1, further comprising:

a rear wall; and a baffle plate defining a wall of a heating compartment;

wherein the heater is arranged between the rear wall and the baffle plate; and wherein the nozzle member extends into a space between the rear wall and the baffle plate;

wherein the second fluid outlet is for supplying water to the heater so as to generate steam, and the first fluid outlet is for supplying a fluid to the rear plate or baffle plate so as to clean it; and wherein the nozzle member is movable between: (i) the first position, in which the first fluid outlet is arranged so as to direct a fluid towards and onto the rear plate or baffle plate; and (ii) the second position, in which the first fluid outlet is blocked or otherwise arranged so as not to direct the fluid towards and onto said rear plate or baffle plate.

14. A method of using the steam oven as claimed in claim 1, the method comprising:

moving the nozzle member into the first position and supplying fluid to the inlet so as to eject the fluid from the nozzle member onto the component of the oven so as to clean it; and moving the nozzle member to the second position so as to block the first fluid outlet;

wherein, when the nozzle member is arranged in the second position, the method comprises supplying water to the inlet so as to eject water from the nozzle member onto the heater to thereby generate steam.

15. An oven comprising:

a heating chamber for heating food in a cooking mode;

an inner chamber; and a baffle plate that separates the heating chamber and the inner chamber;

an injection nozzle comprising a nozzle member that has a fluid inlet and a first fluid outlet that is in communication with the inlet;

wherein at least part of the nozzle member is located in the inner chamber;

wherein the inner chamber is partially defined by the baffle plate and a rear wall opposing the baffle plate, wherein the nozzle member extends through the rear wall;

wherein the nozzle member is movable between: (i) a first position, in which the first fluid outlet is arranged to direct fluid towards and onto a component of the oven to be cleaned; and (ii) a second position, in which the first fluid outlet is blocked or otherwise arranged so as not to direct fluid towards and onto said component.

16. The oven of claim 15, wherein the component of the oven to be cleaned is the rear wall.

17. An oven comprising:

an injection nozzle comprising a support and a nozzle member that has a fluid inlet and a first fluid outlet that is in communication with the inlet;

wherein the nozzle member is movable between: (i) a first position, in which the first fluid outlet is arranged to direct fluid towards and onto a component of the oven to be cleaned; and (ii) a second position, in which the first fluid outlet is blocked or otherwise arranged so as not to direct fluid towards and onto said component;

wherein the nozzle member is moveable relative to the support, and the support comprising an actuator for moving the nozzle member between the first and second positions; and wherein the support comprises a resilient biasing member acting on the nozzle member, wherein the resilient biasing member biases the nozzle member towards either the first position or the second position.

18. The oven of claim 17, wherein the actuator comprises a solenoid that acts on the nozzle member when it is activated so as to cause it to move between the first and second positions.

* * * * *